United States Patent
Jeong et al.

(10) Patent No.: US 6,965,699 B2
(45) Date of Patent: Nov. 15, 2005

(54) CAMERA INFORMATION CODING/DECODING METHOD FOR SYNTHESIZING STEREOSCOPIC REAL VIDEO AND A COMPUTER GRAPHIC IMAGE

(75) Inventors: Se Yoon Jeong, Taejon (KR); Byung Tae Chun, Taejon (KR); Kyu Seo Han, Taejon (KR); Ho Sub Yoon, Taejon (KR); Young Lae Bae, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 641 days.

(21) Appl. No.: 10/121,583

(22) Filed: Apr. 15, 2002

(65) Prior Publication Data

US 2003/0112327 A1    Jun. 19, 2003

(30) Foreign Application Priority Data

Dec. 17, 2001    (KR) ............................... 2001-79920

(51) Int. Cl.⁷ ............................................. G06K 9/36
(52) U.S. Cl. ................................................... 382/232
(58) Field of Search ............................... 382/100, 103, 382/106, 107, 232; 348/42, 47, 50, 51, 584, 348/586, 587, 589, 590, 591, 722; 345/418, 345/419

(56) References Cited

U.S. PATENT DOCUMENTS

| | | | |
|---|---|---|---|
| 4,393,394 A | * | 7/1983 | McCoy ....................... 348/587 |
| 5,175,616 A | * | 12/1992 | Milgram et al. ............... 348/47 |
| 5,740,802 A | * | 4/1998 | Nafis et al. .................. 600/407 |
| 6,122,013 A | * | 9/2000 | Tamir et al. ................. 348/587 |
| 6,349,114 B1 | * | 2/2002 | Mory ....................... 375/240.2 |
| 6,711,590 B1 | * | 3/2004 | Lennon ....................... 707/200 |
| 6,798,406 B1 | * | 9/2004 | Jones et al. .................. 345/419 |
| 6,850,250 B2 | * | 2/2005 | Hoch ......................... 345/632 |

FOREIGN PATENT DOCUMENTS

| | | | | |
|---|---|---|---|---|
| KR | 2001-41862 | 5/2001 | ............ | H04N 7/26 |
| KR | 2001-55957 | 7/2001 | ............ | H04N 7/18 |
| WO | WO 00/42771 | 7/2000 | ............ | H04N 7/26 |

* cited by examiner

*Primary Examiner*—Jose L. Couso
(74) *Attorney, Agent, or Firm*—Mayer, Brown, Rowe & Maw LLP

(57) ABSTRACT

A camera information coding/decoding method for synthesizing stereoscopic real video and a computer graphic image is disclosed. The method stores the camera information generated when picturing, which is not contained in the existing multimedia contents coding standard, that is, the location motion information of the camera and the camera viewpoint displacement information, together with contents as the camera motion information stream. The camera information obtained through the camera position sensor and the camera viewpoint displacement sensor when picturing image is coded and stored together with the contents, thereby easily and precisely synthesizing with the computer graphic image. In addition, since the information may be easily transformed to the descriptor of the camera motion information of MPEG-7 format, there is another advantage of easily carrying out camera motion information indexing operation among searching methods of the multimedia contents.

22 Claims, 7 Drawing Sheets

US 6,965,699 B2

CAMERA INFORMATION CODING/DECODING METHOD FOR SYNTHESIZING STEREOSCOPIC REAL VIDEO AND A COMPUTER GRAPHIC IMAGE

BACKGROUND OF THE INVENTION

1. Field of the Invention

The present invention relates to a camera information coding/decoding method for synthesizing a stereoscopic real video and a computer graphic image, and more particularly, to a camera information coding/decoding method for synthesizing a stereoscopic real video and a computer graphic image, in which camera information required for synthesizing the stereoscopic real video and the computer graphic image is coded upon picturing, and is stored together with contents, thereby shortening a time of calculating the camera information separately and allowing the recorded value to be used.

2. Background of the Related Art

The most general standard among methods of coding digital moving picture contents comprises MPEG-1 format, MPEG-2 format, MPEG-4 format, and MPEG-7 format.

The MPEG-1 format is a standard method of storing data in a storage medium of a constant bit rate, and the MPEG-2 format is a standard for a digital broadcast of high quality, the formats being used in a digital video disc (DVD) and HDTV, respectively.

The MPEG-4 format is a new concept of multimedia coding standard in which an object-oriented idea is firstly introduced. The MPEG-4 format is divided into a scene portion and an object portion. While the conventional standards are divided into an audio portion and a video portion for protecting it, respectively, in view of a simple moving picture, the MPEG-4 format divides the moving picture more closely. Specifically, each of the audio and video is divided by an object, and each object is coded through an optimized method. And then, constructional information of the scene consisting of objects is separately coded, thereby increasing the efficiency.

The MPEG-4 format consists of a visual portion, an audio portion, and a system portion. From now on, it is expected that the multimedia contents coding standards are applied with these concepts, and are continuously developed. In view of these points, the inventors of the present invention proposed a method of storing the camera information as a camera stream object. Moreover, the MPEG-7 format is a searching information coding standard for a search.

The information of the camera happened upon picturing is not contained in the multimedia coding standards, as well as the MPEG formats. Even though the MPEG-7 format has the camera information, it is a method of estimating camera motion through an image processing technique of the video image and storing the estimated resultant. Since the above method contains only information adapted for searching, there is a deficiency in synthesizing the actual image with the computer graphics.

In order to acquire viewpoint information for synthesizing the actual image with the computer graphics, it requires a camera location and a viewpoint upon picturing. Since the existing multimedia coding standards do not contain such information, the environment of the picturing time is reversely estimated to calculate such information and then synthesizing the image. The operation of estimating the camera information is very difficult, so it is hard to acquire the correct resultant.

At present, the contents manufacture of synthesizing the actual image with computer graphics is increased. For example, most of movies employ the computer graphics, and application of virtual information is significantly increased in sportscasts. At that time, a memory header is used to acquire the camera information of the picturing time. On broadcasting a sports game, a score of interested game or information of a player is synthesized with the actual image and is displayed. In addition, since there is no a coding standardizing method of the information of the memory header at present, it is difficult to store the information and apply it. As the image which is recorded, if necessary, is edited and reused, if the pictured image is recorded together with the camera information of the pictured time, it is possible to easily manufacture other contents by synthesizing the actual image with a new computer graphics, if necessary.

Another disadvantage of the existing memory header is that since the information of the camera location displacement can not measured, the location of the camera has to be remained stationary. In case the camera location is displaced, it requires other sensors for measuring the location movement of the camera.

SUMMARY OF THE INVENTION

Accordingly, the present invention is directed to a camera information coding/decoding method for synthesizing stereoscopic real video and a computer graphic image that substantially obviates one or more problems due to limitations and disadvantages of the related art.

An object of the present invention is to provide a camera information coding/decoding method for synthesizing stereoscopic real video and a computer graphic image, in which camera information required for synthesizing the stereoscopic real video and the computer graphic image is coded upon picturing, and is stored together with contents, thereby shortening a time of calculating the camera information separately and allowing the recorded value to be used.

Specifically, since the camera information of the picturing time is not stored in the digital moving picture multimedia coding standard, the viewpoint information required for synthesizing the actual image with the computer graphic image is separately estimated and calculated. There is a drawback that the operation of estimating the viewpoint information is very difficult, and it is hard to acquire the correct resultant. In order to solve the drawback, if the camera location information and the viewpoint information are coded and stored when coding the moving picture, the synthesizing operation of the computer graphics is easily implemented, and it is possible to acquire the correct resultant.

In addition, the present invention may be applied in the case, that the camera location is displaced, by adding the camera location information by mounting a location sensor on a memory header which is applied to a stationary camera only. In view of manufacturing the contents stereoscopically to increase the objective description when synthesizing the real image with the computer graphics, there is provided a camera information coding/decoding method adapted for the stereoscopically pictured image.

To achieve the object and other advantages, according to one aspect of the present invention, there is provided a camera information coding method for synthesizing a stereoscopic real video and a computer graphic image, the method comprising the steps of: detecting and inputting a camera information on a corresponding frame of an image being pictured at present; calculating each component difference between the camera information on an inputted present (t) frame and a camera information on a just previous (t−1) frame to acquire a camera displacement information between the frames; coding the camera displacement information between the frames to compress and store pictured image contents and the coded camera information; and updating the coded camera information on the corresponding frame as the camera information on the previous frame. The camera information comprises at least one of a camera location information (x, y, z) and a camera viewpoint information. The camera viewpoint information comprises at least one of a tilting angle information of the camera, a panning angle information of the camera, a zooming angle of the camera. The camera location information comprises at least one of a tracking information of the camera, a dolling information of the camera, and a booming information of the camera.

The coding step may employ a Huffman or LZW coding method, or an arbitrary entropy coding method.

According to another aspect of the present invention, there is provided a camera information decoding method for synthesizing a stereoscopic real video and a computer graphic image, the method comprising the steps of: if a coded camera information of a current frame at a camera information stream is inputted, decoding the inputted camera to acquire a camera displacement information between the frames; adding the camera displacement information and a camera information of a previous frame to calculate a location vector, viewpoint vector, and upward vector information of the camera of the current frame; updating the calculated location vector, viewpoint vector, and upward vector information of the camera of the current frame as the camera information on the previous frame; and synthesizing the stereoscopic real video and the computer graphic image by use of the location vector, viewpoint vector, and upward vector information of the camera of the current frame.

The step of calculating the location vector information of the camera comprises the steps of: determining whether a bReset value of the camera location information (CameraLocationInfo) of the current frame is true, and if the bReset value is false, adding a DeltaVector of the CameraLocationInfo to a location vector of the previous frame, to acquire a location vector of the camera; updating the location vector of the camera as a previous value for a next calculation; carrying out coordinate system compensation transform of the location vector of the camera for compensating an origin location variation between origins upon implementing the computer graphic synthesis, supposing that the origin is the location of an initial location of the camera; and acquiring locations of left and right cameras which are required for setting the viewpoint of the current frame by carrying out the coordinate system compensation transform.

The method further comprises the steps of: if the bReset value of CameraLocationInfo of the current frame is true, using the CameraLocation information as the location of the left camera as, and calculating a normal vector (Dnormal) by carrying out the coordinate system compensation transform of the location information of the camera to acquire a location vector of the camera as the location of the right camera; updating the location vector of the camera as a previous value for a next calculation; carrying out coordinate system compensation transform of the location vector of the camera for compensating an origin location variation between origins upon implementing the computer graphic synthesis, supposing that the origin is the location of an initial location of the camera; and acquiring locations of left and right cameras which are required for setting the viewpoint of the current frame by carrying out the coordinate system compensation transform.

The normal vector (Dnormal) is parallel with a normal vector of a plane formed by a left viewpoint vector Center and an upward direction vector Up, and has a magnitude corresponding to a distance D between lenses of two cameras.

The method further comprises the step of: to conduct zooming when synthesizing the stereoscopic real video and the computer graphic image, storing a camera constant information used when matching spaces of the actual image and the computer graphic image, a distance information between two lenses used when the right camera information is acquired from the left camera information, and a lens information for determining a rotating amount of a zoom controller upon changing from the minimum distance to the maximum distance of the lens.

The camera constant information comprises at least one of the number of sensors in an x-axis direction of the camera, the number of pixels in an x-axis direction of the camera, a size per sensor in an x-axis direction of the camera, a size per sensor in a y-axis direction of the camera, a size per x-axis pixel, a size per y-axis pixel, a center point of x-axis, a center point of y-axis, and scale element information.

According to still another aspect of the present invention, there is provided a recording medium for executing a camera information coding method for synthesizing a stereoscopic real video and a computer graphic image, the recoding medium capable of being read by a digital processor, and storing a program of commands executed by the digital processor, the program being implemented by types, with the program comprising the steps of: detecting and inputting a camera information on a corresponding frame of an image being pictured at present; calculating each component difference between the camera information on an inputted present (t) frame and a camera information on a just previous (t−1) frame to acquire a camera displacement information between the frames; coding the camera displacement information between the frames to compress and store pictured image contents and the coded camera information; and updating the coded camera information on the corresponding frame as the camera information on the previous frame.

According to further still another aspect of the present invention, there is provided a recording medium for executing a camera information decoding method for synthesizing a stereoscopic real video and a computer graphic image, the recoding medium capable of being read by a digital processor, and storing a program of commands executed by the digital processor, the program being implemented by types, with the program comprising the steps of: if a coded camera information of a current frame at a camera information stream is inputted, decoding the inputted camera to acquire a camera displacement information between the frames; adding the camera displacement information and a camera information of a previous frame to calculate a location vector, viewpoint vector, and upward vector information of the camera of the current frame; updating the calculated location vector, viewpoint vector, and upward vector information of the camera of the current frame as the camera information on the previous frame; and synthesizing the stereoscopic real video and the computer graphic image by use of the location vector, viewpoint vector, and upward vector information of the camera of the current frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a view of a stereoscopic camera with a memory header and a location sensor mounted on a camera stand, in which

FIG. 2 is a view explaining camera motion operation.

DETAILED DESCRIPTION OF THE PREFERRED EMBODIMENTS

A camera information coding/decoding method for synthesizing stereoscopic real video and computer graphic image according to one preferred embodiment of the present invention will now be explained with reference to the accompanying drawings.

Figure 1A:
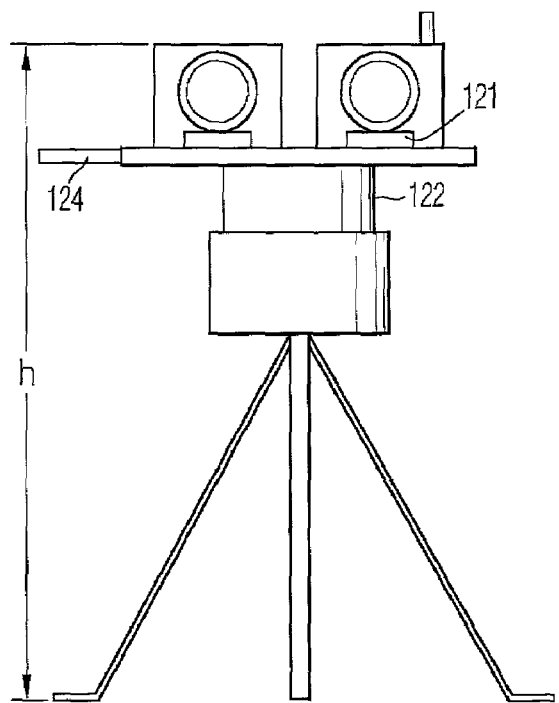
FIG. 1a is a front view of the stereoscopic camera.
Figure 1B:
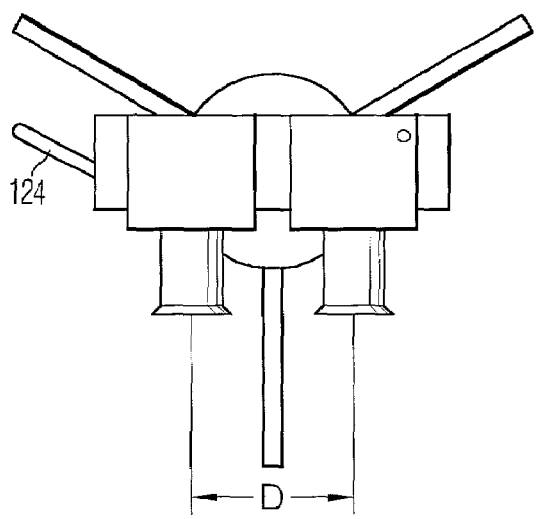
FIG. 1b is a top plan view.
Figure 1C:
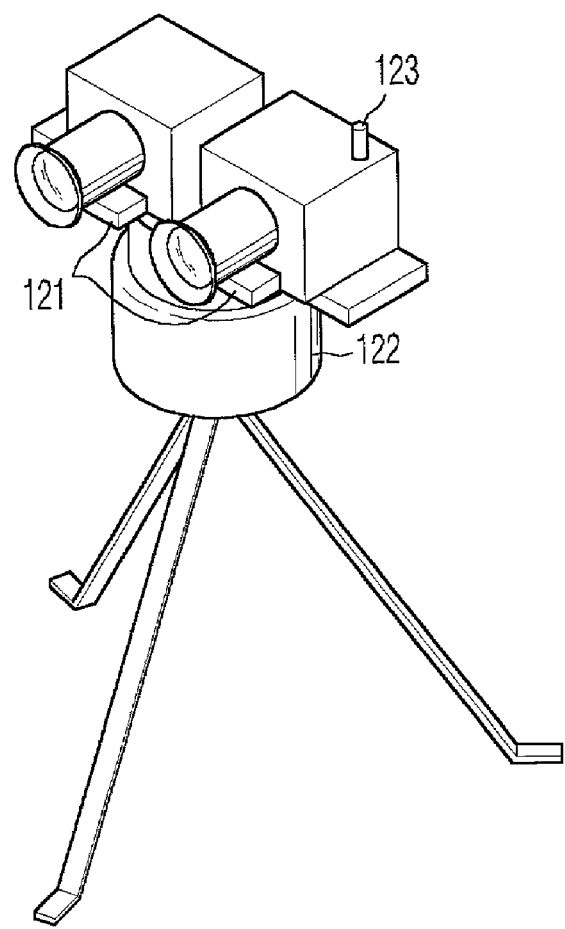
FIG. 1c is a perspective view.

FIG. 1 is a view of a stereoscopic camera with a memory header and a location sensor mounted on a camera stand, in which FIG. 1a is a front view of the stereoscopic camera, FIG. 1b is a top plan view, and FIG. 1c is a perspective view.

The stereoscopic camera shown in FIG. 1 generally employs two cameras, with the cameras being arranged in such a manner that optical axes of these camera are substantially parallel. A distance D between these cameras is about 5 to 10 centimeters corresponding to a distance between eyes of an ordinary person.

Upon taking a picture, a unit for measuring information of camera motion in real time is called as a memory header. The memory header consists of a camera viewpoint motion sensor 122 and a zooming controller 121. The zooming controller 121 comprises a zooming sensor.

The motion sensor 122 is a sensor for measuring tilting information and panning information, and comprises a tilting sensor and a panning sensor. Two zooming controllers 121 are employed in the stereoscopic camera.

Figure 2A:
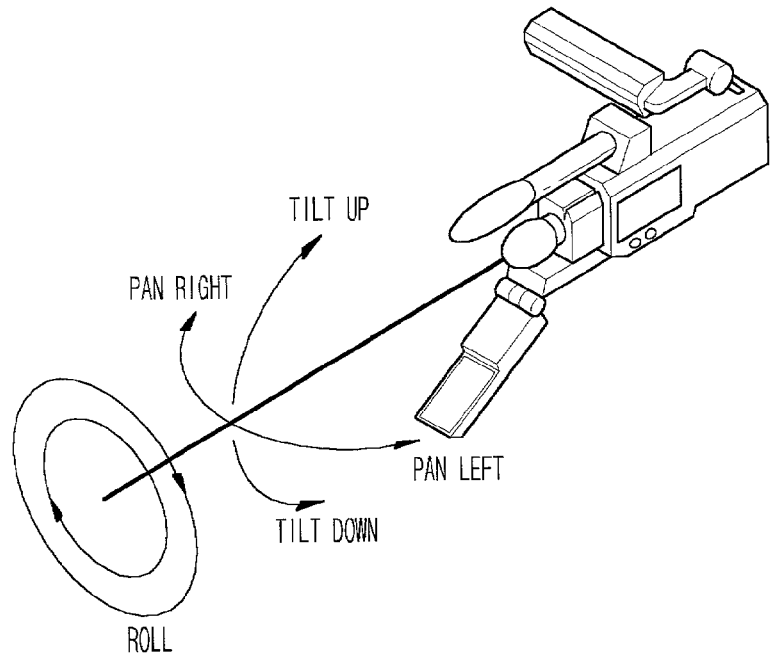
FIG. 2a is a view explaining a viewpoint change motion of camera.
Figure 2B:
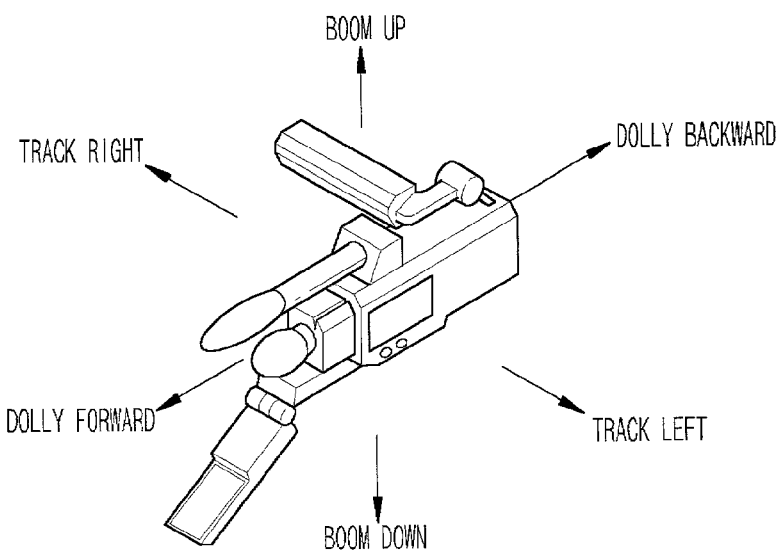
FIG. 2b is a view explaining a location change motion of camera.

The motion morphology of the stereoscopic camera will be considered with reference to FIG. 2. FIG. 2 is a view explaining a camera motion operation of the stereoscopic camera in FIG. 1, in which FIG. 2a is a view explaining a viewpoint change motion of the stereoscopic camera, and FIG. 2b is a view explaining a location change motion of the stereoscopic camera.

In the camera motion, there are two types: one is that the location of the camera is fixed, while a picturing direction, i.e., the viewpoint is altered; and the other is that the viewpoint is maintained in parallel, while the location of the camera is moved.

FIG. 2a is a view illustrating a kind of the viewpoint change motion of the camera. A term "panning" means that a cameraman rotates the camera stand from side to side by use of a handle, thereby changing the camera viewpoint left and right. A term "tilting" means that the cameraman rotates the camera stand up and down by use of the handle, thereby changing the camera viewpoint upward and downward. And, a term "zooming" means that a zoom lens is operated by manipulating the zooming controller 121 attached on the handle of the camera.

Since the motion information of the camera viewpoint is represented by an angle, sensors for obtaining the information are to measure the angle. In other words, the memory header may consist of a plurality of sensors for measuring information of rotating angle in each direction.

Again explaining the function of each sensor in brief, the panning sensor is to measure a horizontal rotating angle of the camera stand, while the tilting sensor is to measure a vertical rotating angle of the camera stand. Two sensors are mounted in the camera stand 122, as shown in FIG. 1.

The zooming sensor is a sensor provided in the zooming controller 121, and is to measure an angle rotated of the zoom lens for adjusting a focus distance of the lens. In case of the stereoscopic camera, two zooming controllers 121 are employed, as shown in FIG. 1. Specifically, the zooming controller and the zooming sensor of the memory header of the stereoscopic camera differ from those of a memory header of a typical camera.

A device capable of identically adjusting the lenses of two cameras must be employed. Therefore, it requires a device capable of simultaneously regulating the zooming by equal amount. Since measured values of two zooming sensors are identical to each other, only one value has to be stored. The coincidence of these units can be realized by use of a digital motor such as a stepping motor.

In order to synthesizing the pictured image and the computer graphic image, it requires transforming information of an image plane and an actual three-dimensional space. The operation of acquiring the information is called as camera calibration. To the end, it requires three-dimensional location information of the camera and information of the lens. In order to acquire the location information of the camera, a location sensor 123 is provided.

The location sensor 123 serves as a role of measuring relative coordinates on a reference point. Upon synthesizing, the relative coordinates are easily calculated as actual coordinates by transforming the reference point to a reference point of a synthesized image.

FIG. 2b is a view explaining the information of the camera location motion, in which a term "tracking" means that the camera moves side by side, a term "booming" means that the camera moves up and down, and a term "dolling" means that the camera moves back and forth. This information is acquired on the basis of a measured value of the location information change of the location sensor 123 in FIG. 1. In view of the measured value of the location sensor 123, if a value of the location sensor 123 is represented by three-dimensional value of x, y and z-coordinates, the tracking may be represented by movement of left/right directions, i e., an x-axis direction, of the location information, the booming may be represented by movement of up/down directions, i.e., a y-axis direction, and the dolling may be represented by movement of back/forth directions, i.e., a z-axis direction.

For reference, according to the present invention, the camera location sensor 123 may be replaced with a common moving object three-dimensional location measuring device may be the camera location sensor 123.

The camera information has to be recorded every frame of video. In order to represent it, FrameCameraInfo descriptor is devised.

FrameCameraInfo {
CameraViewMoveInfo;
CameraLocationInfo
}

The descriptor consists of CameraViewMoveInfo and CameraLocation Info.

CameraViewMoveInfo {
Bool bReset;
Float TiltingAngle;
Float PanningAngle;
Flost ZooningAngle
}
CameraLocationInfo {
Bool bReset;
Float Delta Vector[3]
}

Figure 3:
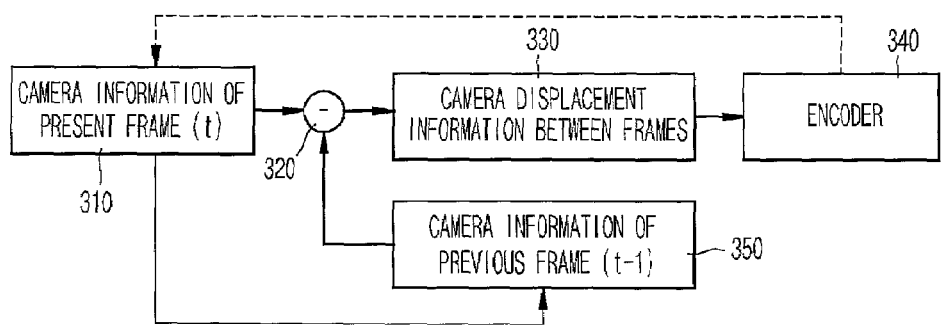
FIG. 3 is a view illustrating the encoding process of the camera motion information of a current frame.

The camera location information and the angle information are required every frame, and it is preferable to record a difference value between the current frame and a previous frame, in order to increase the coding efficiency. In view of the above state, a process of calculating the camera location and viewpoint at the current frame, i.e., a process of coding the camera motion information on the current frame will now be explained with reference to FIG. 3. FIG. 3 is a view illustrating the encoding process of the camera motion information on a current frame.

Camera information 310 of the current frame is inputted from the sensor. At that time, the sensor may be a motion sensor such as a panning sensor, a tilting sensor, a zooming sensor or the like.

The camera information inputted from the sensor comprises a camera location information (x, y, z) and the camera viewpoint information (tilting angle, panning angle, zooming angle). It is noted that the horizontal rotation is represented by a rotation around the y-axis, while the vertical rotation is represented by a rotation around the x-axis. Accordingly, the tilting angle corresponds to an x component, and the panning angle corresponds to a y component.

A difference between the camera information on the present (t) frame inputted from the sensor and the camera information on the just previous (t−1) frame is calculated by a subtractor 320 to acquire a camera displacement information 330 between the frames. The acquired camera displacement information between the frames is coded by a encoder 340. At that time, an arbitrary coding method such as a Huffman coding method or a LZW coding method may be employed. However, the coding method is identical to that of a decoder 410 shown in FIG. 4.

If the coding is completed, the encoder 340 updates the coded frame camera information as the camera information on the previous frame, so that if camera information on a new frame is inputted, the updated frame camera information is used as the camera information on the previous information. The coded camera information is synchronized with the stereoscopic motion picture and is stored.

Such camera displacement information is represented by the CameraViewMoveInfo descriptor and the CameraLocationInfo descriptor. The represented information is compressed and stored by the encoder 340 on recording.

In order to increase error tolerance of the camera information, it is preferable to restart the difference calculation of the camera information after certain time interval. In other words, the difference calculation is restarted every a certain frame unit. In case of restarting the difference, a bReset value of the descriptor is set to true, and the other case is set to false.

In case of restarting the difference calculation, the CameraViewMoveInfo descriptor is not recorded with not the angle information but x, y and z values of the viewpoint vector, respectively.

The FrameCameraInfo descriptor must be synchronized with each frame of the video. To the end, the descriptor may be contained in the header of each frame, and then may be coded. Otherwise, the descriptor may be recoded in separate stream, and then may be coded. In case of inserting the descriptor in the header, since the existing video coding device has to be modified, it is preferable to record the descriptor in separate stream. The separate camera information stream method is adapted for an object-oriented coding scheme such as MPEG-4.

Figure 4:
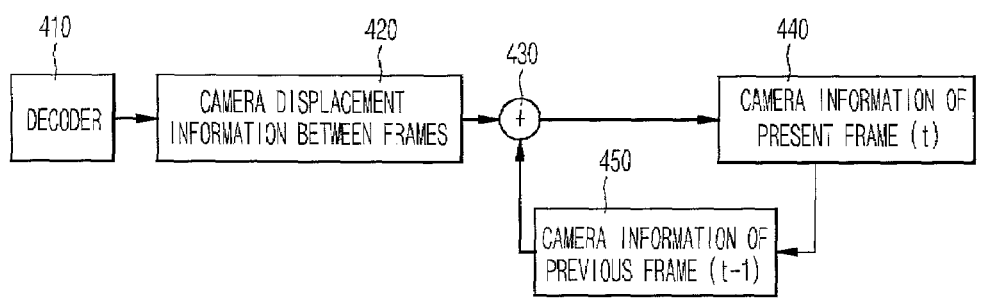
FIG. 4 is a view illustrating the decoding process of camera motion information of a current frame.

FIG. 4 is a view illustrating a decoding process of camera information of a current frame. In the camera information stream, the coded information value of the current frame is inputted in the decoder 410, and is decoded to provide a camera displacement information 420 between the frames. At that time, if the bReset value is false, if other words, if the operation of the camera is not reset, a value of a previous frame 450 is added to the coded camera displacement information between the frames by an adder 430, thereby acquiring a current frame camera information 440, i.e., the present location information (x, y, z) and the view point information (tilting angle, panning angle, and zooming angle) of the camera. For the nest calculation, the value is updated as the previous frame camera information.

Figure 5:
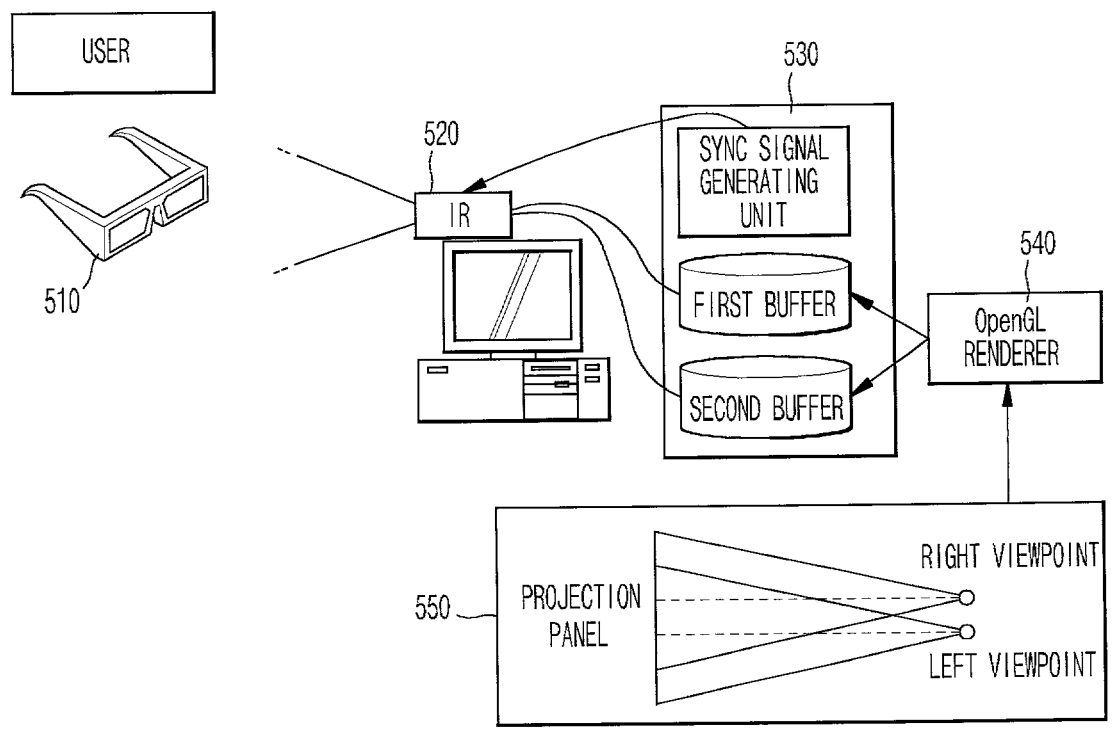
FIG. 5 is a view illustrating a PC-based stereoscopic image display appliance.

FIG. 5 is a view illustrating a PC-based stereoscopic image display appliance. Left image data and right image data are recorded in a first and second buffer of a graphic board 530 supporting a stereoscopic function, respectively. The first buffer is to store the left image data, while the second buffer is to store the right image data.

The left and right image data recoded in the first and second buffers are alternatively outputted to a monitor. In order to see it, a synchronous signal generated by a synchronous signal generating unit of the graphic board 530 is transferred to a shutter glass 510 through an infrared rays emitter 520. At that time, when the left image is outputted, a right shutter is closed, so that a left eye sees a left image only. Otherwise, when the right image is outputted, a left shutter is closed, so that a right eye sees a right image only.

Since this uses an afterimage effect, the image is three-dimensionally seen. At that time, in order to prevent the dizziness while a user sees the image, a frequency of the left and right image data must be above 100 Hz.

The computer graphic synthesis of the left and right images is implemented by an OpenGL renderer 540. In order to three-dimensionally display the image of a stereoscopic mode, a left viewpoint and a right viewpoint are calculated by a viewpoint calculator 550 every frame, and are stored in the OpenGL renderer 540.

The designation of the viewpoint is processed by a gluLookAt function of OpenGL. The following are function prototypes of gluLookAt.

Void gluLookAt (
GLdouble eyex;

GLdouble eyey;
GLdouble eyez;
GLdouble centerx;
GLdouble centery;
GLdouble cetnerz;
GLdouble centerz;
GLdouble upx;
GLdouble upy;
GLdouble upz;
)

Parameters eyex, eyey and eyez are position vectors of eye, i.e., the camera, parameters centerx, centery and centerz are direction vectors at which the camera levels, and parameters upx, upy and upz are upward direction vectors of the camera.

The viewpoint calculator 550 calculates the parameters eyex, eyey and eyez, the parameters centerx, centery and centerz, and the parameters upx, upy and upz, which are required in the gluLookAt function, by use of FrameCameraInfo.

In the viewpoint calculator 550, a method of calculating the parameters eyex, eyey and eyez, a method of calculating the parameters centerx, centery and centerz, and a method of calculating the parameters upx, upy and upz will now be explained with reference to FIGS. 6 and 7.

Figure 6:
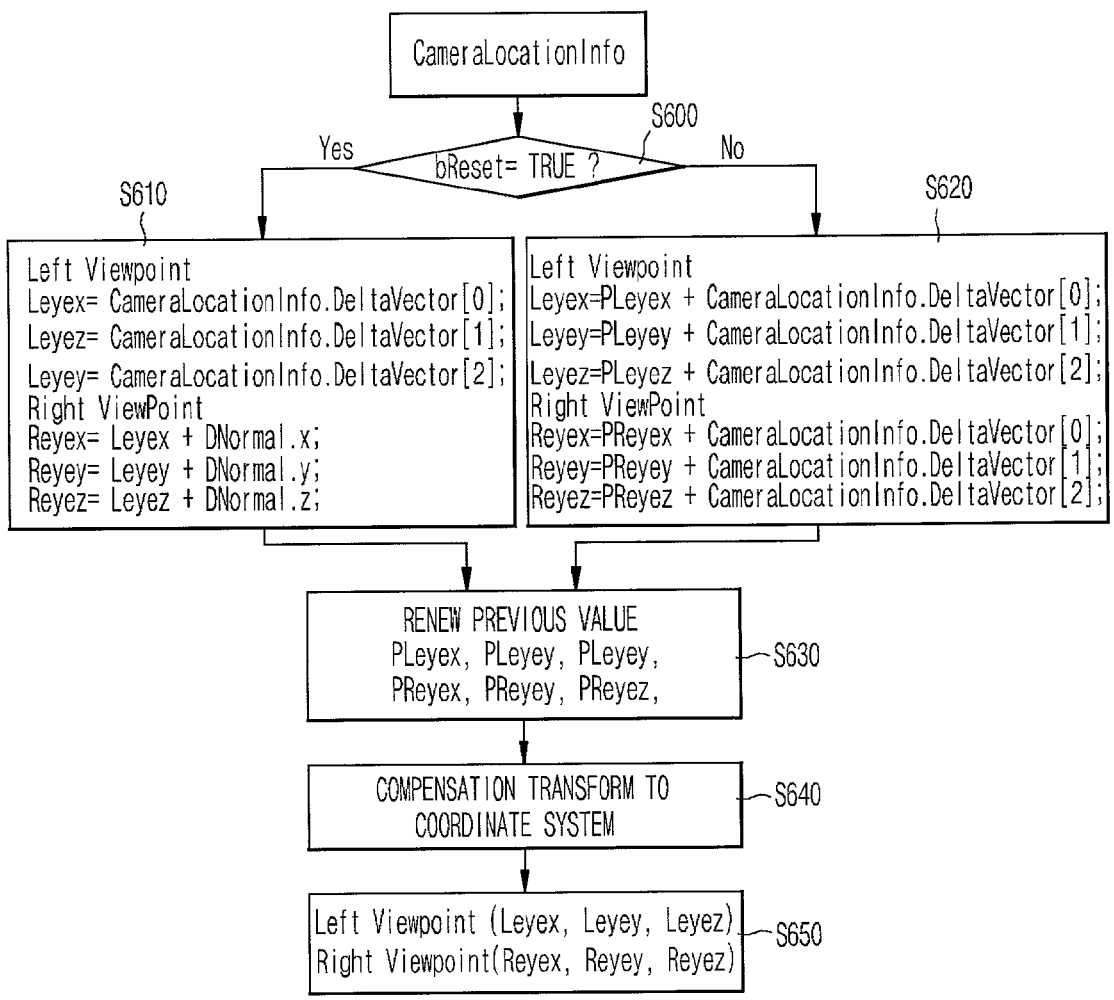
FIG. 6 is a flowchart showing a process of calculating position vectors of a camera for a present left and right frame.

FIG. 6 is a flowchart showing a process of calculating position vectors (eyex, eyey eyez) of a camera for the present left and right frame.

Firstly, explaining the left/right camera location information, it is determined whether or not a bReset value of CameraLocationInfo of the current frame is true (step S600).

Figure 7:
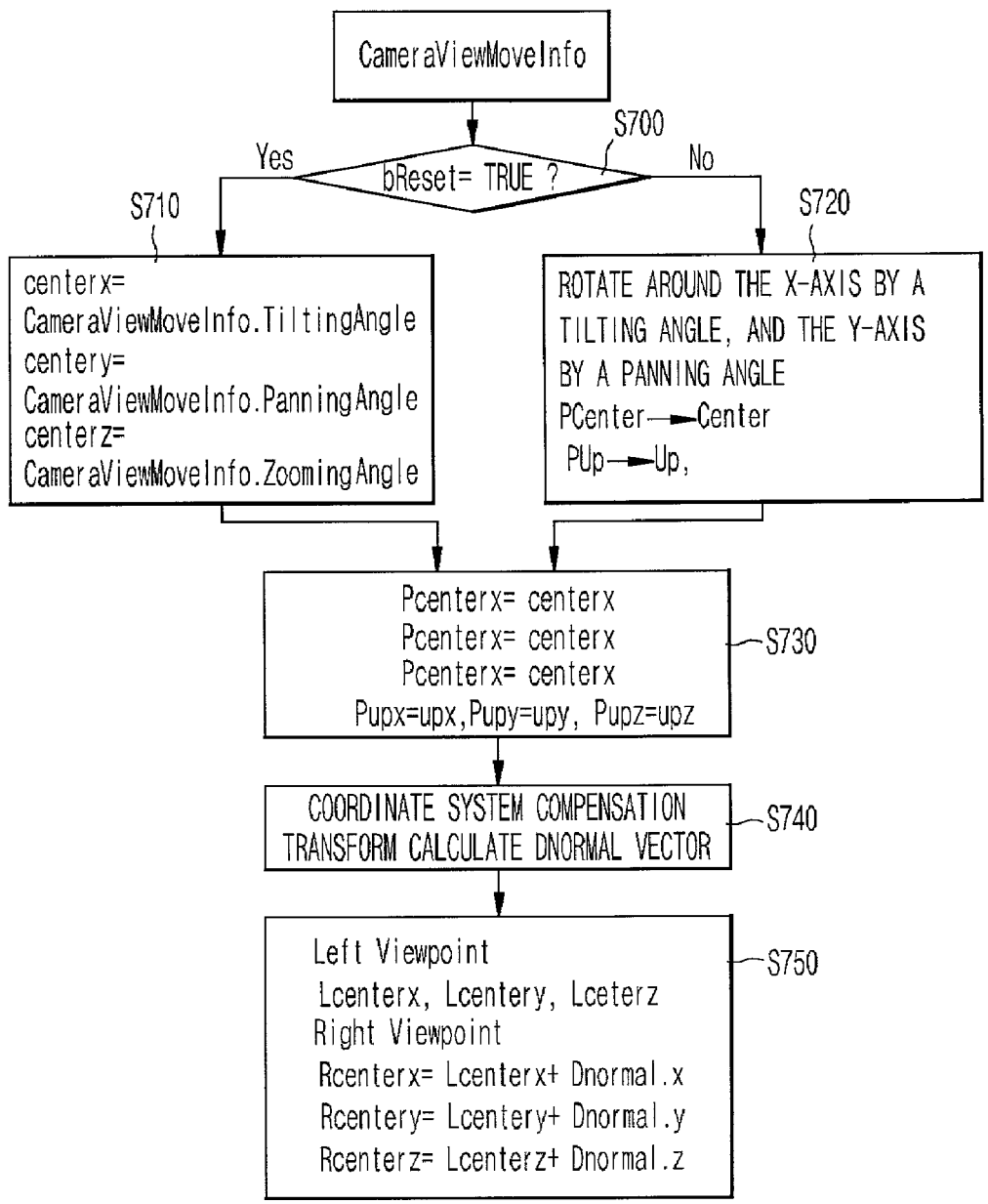
FIG. 7 is a flowchart showing a process of calculating a viewpoint vector and upward direction vector of present left and right frames.

As a result, if the bReset value of CameraLocationInfo of the current frame is true, in other words, if the camera is reset, the location of the left camera uses the CameraLocation information as it is, while the location of the right camera is acquired by adding a normal vector Dnormal calculated in step S740 of FIG. 7. That is, the locations of the left and right cameras are represented by vectors as follows:

Left Viewpoint
Leyex=CameraLocationInfo.DeltaVector[0];
Leyey=CameraLocationInfo.DeltaVector[1]; and
Leyez=CameraLocationInfo.DeltaVector[2].
Right Viewpoint
Reyex=Leyex+Dnormal.x;
Reyey=Leyey+Dnormal.y; and
Reyez=Leyez+Dnormal.z.

The normal vector Dnormal is parallel with a normal vector of a plane formed by a left viewpoint vector Center and an upward direction vector Up, and has a magnitude of a distance D between lenses of two cameras. A method of calculating the normal vector Dnormal value will be explained in detail with reference to FIG. 7.

If the bReset value of CameraLocationInfo of the current frame is false in the step S600, the location of the right camera is acquired by adding the vector of the previous location and DeltaVector of the CameraLocationInfo (step S620). That is, if the bReset value of CameraLocationInfo of the current frame is false, the locations of the left and right cameras are represented by vectors as follows:

Left Viewpoint
Leyex=PLeyex+CameraLocationInfo.DeltaVector[0];
Leyey=PLeyey+CameraLocationInfo.DeltaVector[1]; and
Leyez=PLeyez+CameraLocationInfo.DeltaVector[2].
Right Viewpoint
Reyex=PReyex+CameraLocationInfo.DeltaVector[0];
Reyey=PReyey+CameraLocationInfo.DeltaVector[1]; and
Reyez=PReyez+CameraLocationInfo.DeltaVector[2].

The calculated results(Leyex, Leyey, Leyez, Reyex, Reyey, Reyez) are stored in the previous value (PLeyex, PLeyey, PLeyez, PReyex, PReyey, PReyez) for the next calculation (step S630).

And then, compensation of the coordinate system is transformed (step S640). Supposing that the location of the initial location sensor is the origin, it compensates origin location variation between the origins upon implementing the computer graphic synthesis. The compensation may be implemented by use of a common coordinate system transform operation. The locations of the left and right cameras which are required for setting the viewpoint of the current frame are acquired by carrying out the coordinate system compensation transform (step S650). That is, the locations of the left and right cameras are represented by vectors as follows:

Left Viewpoint Location (Leyex, Leyey, Leyez)
Right Viewpoint Location (Reyex, Reyey, Reyez)

And then, the method of calculating the parameters centerx, centery and centerz of the left camera and the parameters upx, upy and upz of the right camera will now be explained with reference to FIG. 7.

FIG. 7 is a flowchart showing a process of calculating the viewpoint vector and upward direction vector by receiving CameraViewMoveInfo of the current frame.

Firstly, it is determined whether or not a bReset value of CameraViewMoveInfo of the current frame is true (step S700).

As a result, if the bReset value of CameraViewMoveInfo of the current frame is true, the value of the CameraViewInfo is a viewpoint vector value (step S710). In other words, a centerx value is a CameraViewMoveInfo.TiltingAngle value, a centery value is a CameraViewMoveInfo.PanningAngle value, and a centerz value is a CameraViewMoveInfo.ZoomingAngle value.

Meanwhile, if the bReset value of CameraViewMoveInfo is false, a vector is calculated by carrying out the operation of rotating the previous vector and the upward direction vector around the x-axis by a tilting angle, and around the y-axis by a panning angle (step S720).

The values calculated in the steps S710 and S720 are updated in the previous vector for the next calculation (step S730).

And then, it calculates a normal vector Dnormal which is parallel with a normal vector of a plane formed by a left viewpoint center and an upward direction vector up and has a magnitude of a distance D between two lenses (step S740).

The viewpoint vector which is carried out the coordinate system compensation is a viewpoint vector of a left eye, and the vector is added to the Dnormal vector to acquire a viewpoint vector of a right eye (step S750). That is, the viewpoint vector (Left Viewpoint) of the left eye is Lcenterx, Lcentery, and Lcenterz, while the viewpoint vector (Right Viewpoint) of the right eye is:

Rcenterx=Lcenterx+Dnormal.x;
Rcentery=Lcentery+Dnormal.y; and
Rcenterz=Lcenterz+Dnormal.x.

The resultant vectors calculated in FIGS. 6 and 7 are designated to the left and right viewpoints of the OpenGL renderer 540 by use of parameters of a gluLookAt function.

In order to conduct the zooming, initial information of the camera is required. The architecture of CameraInitInfo descriptor for recording the initial information may be represented as follows:

CameraInitInfo {/*camera initial information*/
/*camera constant*/

```
double Ncx; /*[sel] the number of sensors in an x-axis
    direction of camera*/
double Nfx; /*[pix] the number of pixels in an x-axis
    direction of camera*/
double dx; /*[mm/sel] a size per sensor in an x-axis
    direction of camera*/
double dy; /*[mm/sel] a size per sensor in a y-axis
    direction of camera*/
double dpx; /*[mm/pix] a size per x-axis pixel*/
double dpy; /*[mm/pix] a size per y-axis pixel*/
double Cx; /*[pix] a center point of x-axis*/
double Cy; /*[pix] a center point of y-axis*/
double sx; /* scale element*/
double D /*distance between two lenses*/
/*lens information*/
double Fmin /*minimum focus distance*/
double Fmax /*maximum focus distance*/
double LenZRotationAngle /*a rotating angle from mini-
    mum focus distance to maximum focus distance*/
}
```

The descriptor of the above initial camera information contains the camera constant, the distance between lenses of two cameras, and lens information. The camera constant is used as information of matching the space of the actual image and computer graphic image.

The distance D between two lenses is used when the right camera information is acquired from the left camera information. The lens information is to adjust a rotating amount of the zoom controller in the change from the minimum distance to the maximum distance of the lens.

It is possible to know a changed amount of the focus distance on the basis of the changed amount of the zoom controller by use of the information. In other words, it is used to alter the CameraMoveInfo.ZoomingAngle information as the actual zooming information. For reference, there are several methods of treating the zooming in the OpenGL, wherein one of the methods alters FOV among the parameters of gluPerspective function.

At the beginning of taking a picture, supposing that the location of the left camera, i.e., CameraLocation is the original and the viewpoint vector is a minus z direction, the coordinate system compensation transform may be facilitated. Herein, the present invention treats the locations of the location sensor and the left camera as the same. In all cases, an error between the locations is a negligible quantity.

With the camera information coding/decoding method for synthesizing stereoscopic real video and a computer graphic image according to one preferred embodiment of the present invention, the camera information generated when picturing, which is not contained in the existing multimedia contents coding standard, that is, the location motion information of the camera and the camera viewpoint displacement information, is stored together with contents as the camera motion information stream. In other words, the camera information obtained through the camera position sensor and the camera viewpoint displacement sensor when picturing image is coded and stored together with the contents, thereby easily and precisely synthesizing with the computer graphic image. in addition, since the information may be easily transformed to the descriptor of the camera motion information of MPEG-7 format, there is another advantage of easily carrying out camera motion information indexing operation among searching methods of the multimedia contents.

Furthermore, since the camera information coding/decoding method of the present invention targets not a single stationary camera image but a mobile stereoscopic camera image, it is possible to easily manufacture more realistic synthesized image contents.

The forgoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A camera information coding method for synthesizing a stereoscopic real video and a computer graphic image, the method comprising the steps of:
    detecting and inputting a camera information on a corresponding frame of an image being pictured at present;
    calculating each component difference between the camera information on an inputted present (t) frame and a camera information on a just previous (t−1) frame to acquire a camera displacement information between the frames;
    coding the camera displacement information between the frames to compress and store pictured image contents and the coded camera information; and
    updating the coded camera information on the corresponding frame as the camera information on the previous frame.

2. The camera information coding method as claimed in claim 1, wherein the camera information comprises at least one of a camera location information (x, y, z) and a camera viewpoint information.

3. The camera information coding method as claimed in claim 2, wherein the camera viewpoint information comprises at least one of a tilting angle information of the camera, a panning angle information of the camera, a zooming angle of the camera and a rolling information of the camera.

4. The camera information coding method as claimed in claim 2, wherein the camera location information comprises at least one of a tracking information of the camera, a dolling information of the camera, and a booming angle of the camera.

5. The camera information coding method as claimed in claim 1, wherein the coding step employs a Huffman or LZW coding method, or an arbitrary entropy coding method.

6. A camera information decoding method for synthesizing a stereoscopic real video and a computer graphic image, the method comprising the steps of:
    if a coded camera information of a current frame at a camera information stream is inputted, decoding the inputted camera to acquire a camera displacement information between the frames;
    adding the camera displacement information and a camera information of a previous frame to calculate a location vector, viewpoint vector, and upward vector information of the camera of the current frame;
    updating the calculated location vector, viewpoint vector, and upward vector information of the camera of the current frame as the camera information on the previous frame; and
    synthesizing the stereoscopic real video and the computer graphic image by use of the location vector, viewpoint vector, and upward vector information of the camera of the current frame.

7. The camera information decoding method as claimed in claim 6, wherein the step of calculating the location vector information of the camera comprises the steps of:

determining whether a bReset value of the camera location information (CameraLocationInfo) of the current frame is true, and if the bReset value is false, adding a DeltaVector of the CameraLocationInfo to a location vector of the previous frame, to acquire a location vector of the camera;

updating the location vector of the camera as a previous value for a next calculation;

carrying out coordinate system compensation transform of the location vector of the camera for compensating an origin location variation between origins upon implementing the computer graphic synthesis, supposing that the origin is the location of an initial location of the camera; and acquiring locations of left and right cameras which are required for setting the viewpoint of the current frame by carrying out the coordinate system compensation transform.

8. The camera information decoding method as claimed in claim 7, further comprising the steps of:

if the bReset value of CameraLocationInfo of the current frame is true, using the CameraLocation information as the location of the left camera as, and calculating a normal vector (Dnormal) by carrying out the coordinate system compensation transform of the location information of the camera to acquire a location vector of the camera as the location of the right camera;

updating the location vector of the camera as a previous value for a next calculation;

carrying out coordinate system compensation transform of the location vector of the camera for compensating an origin location variation between origins upon implementing the computer graphic synthesis, supposing that the origin is the location of an initial location of the camera; and acquiring locations of left and right cameras which are required for setting the viewpoint of the current frame by carrying out the coordinate system compensation transform.

9. The camera information decoding method as claimed in claim 8, wherein the normal vector (Dnormal) is parallel with a normal vector of a plane formed by a left viewpoint vector Center and an upward direction vector Up, and has a magnitude corresponding to a distance D between lenses of two cameras.

10. The camera information decoding method as claimed in claim 6, further comprising the step of: to conduct zooming when synthesizing the stereoscopic real video and the computer graphic image, storing a camera constant information used when matching spaces of the actual image and the computer graphic image, a distance information between two lenses used when the right camera information is acquired from the left camera information, and a lens information for determining a rotating amount of a zoom controller upon changing from the minimum distance to the maximum distance of the lens.

11. The camera information decoding method as claimed in claim 10, wherein the camera constant information comprises at least one of the number of sensors in an x-axis direction of the camera, the number of pixels in an x-axis direction of the camera, a size per sensor in an x-axis direction of the camera, a size per sensor in a y-axis direction of the camera, a size per x-axis pixel, a size per y-axis pixel, a center point of x-axis, a center point of y-axis, and scale element information.

12. A recording medium for executing a camera information coding method for synthesizing a stereoscopic real video and a computer graphic image, the recoding medium capable of being read by a digital processor, and storing a program of commands executed by the digital processor, the program being implemented by types, with the program comprising the steps of:

detecting and inputting a camera information on a corresponding frame of an image being pictured at present;

calculating each component difference between the camera information on an inputted present (t) frame and a camera information on a just previous (t−1) frame to acquire a camera displacement information between the frames;

coding the camera displacement information between the frames to compress and store pictured image contents and the coded camera information; and updating the coded camera information on the corresponding frame as the camera information on the previous frame.

13. A recording medium for executing a camera information decoding method for synthesizing a stereoscopic real video and a computer graphic image, the recoding medium capable of being read by a digital processor, and storing a program of commands executed by the digital processor, the program being implemented by types, with the program comprising the steps of:

if a coded camera information of a current frame at a camera information stream is inputted, decoding the inputted camera to acquire a camera displacement information between the frames;

adding the camera displacement information and a camera information of a previous frame to calculate a location vector, viewpoint vector, and upward vector information of the camera of the current frame;

updating the calculated location vector, viewpoint vector, and upward vector information of the camera of the current frame as the camera information on the previous frame; and synthesizing the stereoscopic real video and the computer graphic image by use of the location vector, viewpoint vector, and upward vector information of the camera of the current frame.

14. The program as claimed in claim 12, wherein the camera information comprises at least one of a camera location information (x, y, z) and a camera viewpoint information.

15. The camera information coding method as claimed in claim 14, wherein the camera viewpoint information comprises at least one of a tilting angle information of the camera, a panning angle information of the camera, a zooming angle of the camera and a rolling information of the camera.

16. The camera information coding method as claimed in claim 14, wherein the camera location information comprises at least one of a tracking information of the camera, a dolling information of the camera, and a booming angle of the camera.

17. The camera information coding method as claimed in claim 12, wherein the coding step employs a Huffman or LZW coding method, or an arbitrary entropy coding method.

18. The program as claimed in claim 13, wherein the step of calculating the location vector information of the camera comprises the steps of:

determining whether a bReset value of the camera location information (CameraLocationInfo) of the current frame is true, and if the bReset value is false, adding a DeltaVector of the CameraLocationInfo to a location vector of the previous frame, to acquire a location vector of the camera;

updating the location vector of the camera as a previous value for a next calculation;

carrying out coordinate system compensation transform of the location vector of the camera for compensating an origin location variation between origins upon implementing the computer graphic synthesis, supposing that the origin is the location of an initial location of the camera; and acquiring locations of left and right cameras which are required for setting the viewpoint of the current frame by carrying out the coordinate system compensation transform.

19. The camera information decoding method as claimed in claim 18, further comprising the steps of:

if the bReset value of CameraLocationInfo of the current frame is true, using the CameraLocation information as the location of the left camera as, and calculating a normal vector (Dnormal) by carrying out the coordinate system compensation transform of the location information of the camera to acquire a location vector of the camera as the location of the right camera;

updating the location vector of the camera as a previous value for a next calculation;

carrying out coordinate system compensation transform of the location vector of the camera for compensating an origin location variation between origins upon implementing the computer graphic synthesis, supposing that the origin is the location of an initial location of the camera; and acquiring locations of left and right cameras which are required for setting the viewpoint of the current frame by carrying out the coordinate system compensation transform.

20. The camera information decoding method as claimed in claim 19, wherein the normal vector (Dnormal) is parallel with a normal vector of a plane formed by a left viewpoint vector Center and an upward direction vector Up, and has a magnitude corresponding to a distance D between lenses of two cameras.

21. The camera information decoding method as claimed in claim 13, further comprising the step of: to conduct zooming when synthesizing the stereoscopic real video and the computer graphic image, storing a camera constant information used when matching spaces of the actual image and the computer graphic image, a distance information between two lenses used when the right camera information is acquired from the left camera information, and a lens information for determining a rotating amount of a zoom controller upon changing from the minimum distance to the maximum distance of the lens.

22. The program as claimed in claim 21, wherein the camera constant information comprises at least one of the number of sensors in an x-axis direction of the camera, the number of pixels in an x-axis direction of the camera, a size per sensor in an x-axis direction of the camera, a size per sensor in a y-axis direction of the camera, a size per x-axis pixel, a size per y-axis pixel, a center point of x-axis, a center point of y-axis, and scale element information.

* * * * *